United States Patent [19]

Takeuchi et al.

[11] Patent Number: 4,463,608
[45] Date of Patent: Aug. 7, 1984

[54] ULTRASOUND IMAGING SYSTEM

[75] Inventors: Yasuhito Takeuchi; Keiki Yamaguchi, both of Musashino, Japan

[73] Assignee: Yokogawa Hokushin Electric Corp., Tokyo, Japan

[21] Appl. No.: 145,852

[22] Filed: May 1, 1980

[30] Foreign Application Priority Data

May 7, 1979 [JP] Japan .................................. 54-55524
May 7, 1979 [JP] Japan .................................. 54-55525

[51] Int. Cl.$^3$ .......................................... G01N 29/00
[52] U.S. Cl. ...................................... 73/606; 73/602; 73/608; 73/626
[58] Field of Search ................. 73/606, 607, 608, 626, 73/628, 602; 367/7, 8, 10, 11

[56] References Cited

U.S. PATENT DOCUMENTS

| 4,006,627 | 2/1977 | Bossaert ................................. 73/608 |
| 4,157,665 | 6/1979 | Bridoux et al. ........................ 73/607 |
| 4,174,634 | 11/1979 | Dory ....................................... 73/606 |

FOREIGN PATENT DOCUMENTS

| 1316497 | 5/1973 | United Kingdom .................. 73/606 |
| 1364254 | 8/1974 | United Kingdom .................. 73/606 |
| 1476146 | 6/1977 | United Kingdom .................. 73/606 |

OTHER PUBLICATIONS

P. D. Hanstead, "A New Ultrasonic Focussing System for Materials Inspection", J. Phys. D: Appl. Phys., vol. 7, pp. 226-241, 1974.

Primary Examiner—Stephen A. Kreitman
Attorney, Agent, or Firm—Parmelee, Bollinger & Bramblett

[57] ABSTRACT

The invention relates to an ultrasonic imaging system for diagnostic use or non-destructive testing. The system comprises a first array of ultrasonic transducers coupled to the object space wherein objects under examination are located or distributed; a second array of ultrasonic transducers coupled to a reconstitution space wherein the acoustic images of the objects are to be replicated; and time inversion means. The time inversion means has a set of waveform memories which first captures the ultrasonic signals from said objects, typically echos produced in response to suitable excitation, via said first array of ultrasonic transducers with suitable amplification and preconditioning as necessary. Then readouts of these signals are provided inversely in time which drive the second array of ultrasonic transducers with said time inverted signals to reproject inversely propagating ultrasonic wavetrains forming replicated acoustic images of the objects. By optically monitoring the ultrasonic energy distribution in said reconstitution space, via an opto-acoustic interaction effect, the system enables the observation of the object images in real time on each complete acquisition of said ultrasonic signal set at the first array of transducers, i.e. one complete picture per each echo sounding, which means in case of a medical diagnostic system of up to several thousand pictures per second.

19 Claims, 21 Drawing Figures

ULTRASOUND IMAGING SYSTEM

BACKGROUND OF THE INVENTION

The invention relates to ultrasonic imaging systems for observing the distribution of ultrasonic sources as an image, or a series of such images, the sources being either emitters or echo sources with suitable projection or excitation.

For example, ultrasonic imaging systems for medical diagnostic use or industrial non-destructive testing have been, similarly to the RADARs or SONARs, constructed and used in the form of a so called "B-scope" to represent the target images for easy visual interpretation. A typical style of such a diagnostic ultrasound imager for real time monitoring is illustrated in FIG. 1. Using an array of small transducer elements (2) coupled to an object, i.e. human body (1), a series of narrow pulsed ultrasonic energy is projected into the object (1), and the echos from the target are received by the same array (2). Scanning is done by selecting or shifting the active element or elements within said array, and the echo intensity is displayed on a CRT screen (3) with the intensity modulation of a spot being deflected analogously in accordance with the sound propagation. A complete picture is constructed with a significant number of successive scannings, e.g. ≳100, the picture rate (or so called "frame rate") being practically limited by the propagating velocity of sound in the object space, i.e. in case of the human body nearly equivalent to that of water or about 1.5 Km/sec. For example, 100 scan lines for about 20 cm depth enables no more than about 30 pictures/sec., which is fairly marginal for detailed recognition for human sight without flicker. For these kinds of "line-serial" imaging schemes improvement on this sound velocity limited picture rate problem (in other words, line number vs. picture rate problem) has been limited, although inter-lacing techniques, multiple, simultaneous, transmission-reception techniques, or inter-line interpolation techniques, etc. have been proposed. In case of sector scanning with a high speed rotating transducer, or an electronic phased array method, the situation is essentially the same.

On the other hand, an omnidirectional transmission from point, line or planar source followed by reception with a similar array transducer enables a post-computation imaging scheme, but the requirements for computation speed and/or capacity for actual real time monitoring is still far from practical feasibility.

DESCRIPTION OF THE PRIOR ART

An essential improvement on this sound velocity limitation problem, without using any complicated signal processing or computation, has already been proposed by Dr. J. C. Somer of the Netherland, as presented in the IEEE 1977 Ultrasound Symposium and published in its proceedings 1977 Ultrasound Symposium Proceeding, IEEE catalog #77CH-1264-1SU, pages 1002–1005. His system is like that illustrated in FIG. 2, comprising of a big water tank (4) having a cylindrical mirror for ultrasound (7) and a "second" transducer array (6) at its center. The ultrasonic echo signals from the "first" transducer array (2) coupled to the object space (1) are applied to the second array (6) via a plurality of amplifiers (51), (52) . . . .

On an omnidirectional transmission of narrow pulsed ultrasound energy, for example, pulsing only one element of said first array (2) provides a cylindrical wavefront into the object space (1). The echo signals from targets (8) and (9) are captured by said first array (2) and are re-transmitted immediately as coming in by said second array (6) into the water in the tank (4). The re-transmitted echo wave travels across the tank and is reflected by the cylindrical mirror (7) back toward the second array (6). However, along the course back the echo waves form a replicated image for their sources. The re-transmitted waveforms (81) and (91) from echo sources (8) and (9) are located at analogous places to their sources, respectively, with twice the travelling time between the second array (6) and the mirror (7), from the initial omnidirectional transmission into the object space (1), provided the signal channels including the amplifiers (51) and (52) have no delay. At this particular moment an optical snapshot of the water tank might be taken using an acousto-optic conversion effect, for example, a pulsed schlieren optical system so as to obtain a replicated target image. The maximum detectable range is R/2 when the radius of the mirror (7) is R, and when both object space (1) and image replicating space (the water tank) are acoustically equivalent to water. However, the tank may get so huge when observing the human body that a 60 cm or more space would be necessary in order to observe an abdominal tomogram, and such a size would require significant difficulty to obtain both mechanical and optical accuracy for precise schlieren optics. Also, this method would suffer from off-axis defocusing because the mirror must see the second array as a nearly point (or "line") source in order to reflect the ultrasound energy back accurately in the opposite direction, but actually does not. Accordingly, a good quality reconstructed image is available only in a limited part of the huge water tank. However, Dr. Somer's method actually provides a "real time", "parallel" image on each echo-set sounding following each transmission, without any complicated signal processing or post-computation. A frame-rate up to C/2R (C=sound velocity in water) would be obtained. (Not C/R, because only one set of echo signals could be travelling in the water tank (7), at any instance).

SUMMARY OF THE INVENTION

This invention provides an ultrasonic, real time imaging system using a schlieren optical system as a visualizer coupled to its ultrasonic reconstitution space, where images of targets or objects are replicated ultrasonically.

This method provides a real time imaging system with a very high picture frame rate which essentially cannot be obtained with conventional line-serial scanning B-scopes, for example, electronic linear or phased array sector scanners for medical applications. The picture rate available with this invention is very high, e.g. up to several thousand pictures per second while a conventional B-scope display is limited to thirty or fourty frames and no more than a hundred pictures per second.

As illustrated in the preferred embodiments, the system comprises a first transducer array coupled to object space wherein targets are distributed; a second transducer array coupled to reconstitution space wherein the images of said targets in the object space are to be replicated; and wavefrom memory means which first capture the electric signals, typically echos, from each element of said first transducer array after suitable amplification, time-gain compensation, or other pre-conditionings as necessary, and then transponds these signals inversely to said second transducer array to form inverse propagating waves converging into a replica image of said targets.

The reconstitution space is comprised of or filled with an isotropic material which is transparent both for ultrasound and light energy, for example, selected from glasses, plastics, oils or water, etc. An optical monitoring means, typically a schlieren optical system is coupled to said replicated ultrasound energy distribution for direct viewing by the human eye, or TV camera, or still-photography or movie.

The schlieren system may be continuous, pulsed or strobed having a suitable control means for its light source, which may either be coherent or incoherent, typically a rapid gas-discharge tube (strobo flash light), or gas, solid, or semiconductor laser. A synchronism or sweep in step with the reconstitution of said ultrasound energy replicating the objects, is provided as required.

In the waveform memory means the echo signal set may be arranged electronically or computatively with suitable hardware or software, to enhance or suppress some desired part or some desired characteristics of the image, e.g. in a special case, to indicate the moving targets only (MTI). The inter-frame MTI system thus enabled is, according to its very high frame-rate, capable of displaying a Doppler image of, for example, internal vascular systems, in real time.

BRIEF DESCRIPTION OF THE DRAWINGS

The invention, together with further aspects, objects and advantages thereof, will be more clearly understood from the following description taken in conjunction with the accompanying drawings in which like elements are identified with the same reference characters.

DESCRIPTION OF THE PREFERRED EMBODIMENTS

Figure 1:
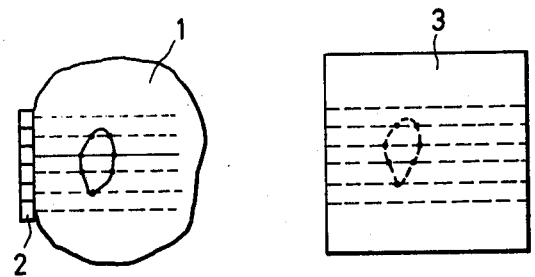
FIG. 1 shows the theory of operation found in conventional electronic linear B-scan apparatus commercially available for medical applications.
Figure 2:
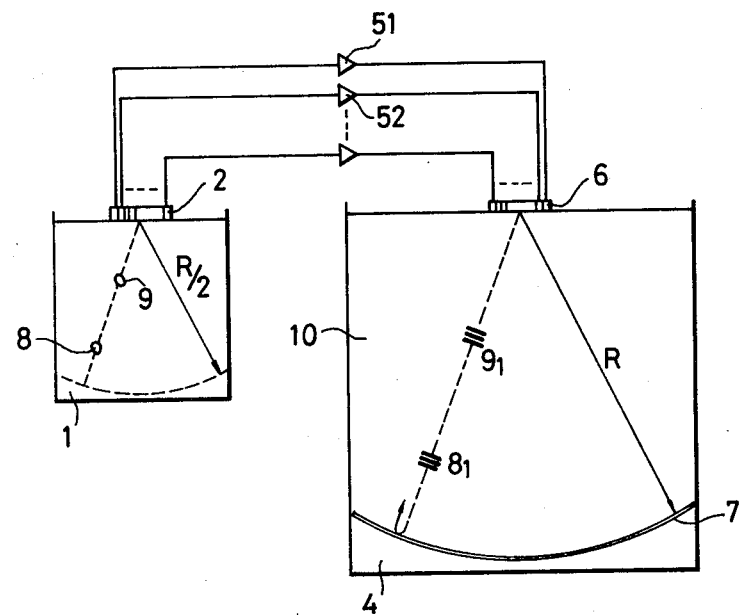
FIG. 2 shows an example of a high frame-rate imaging system having opto-acoustic interaction found in Dr. Somer's report.
Figure 3:
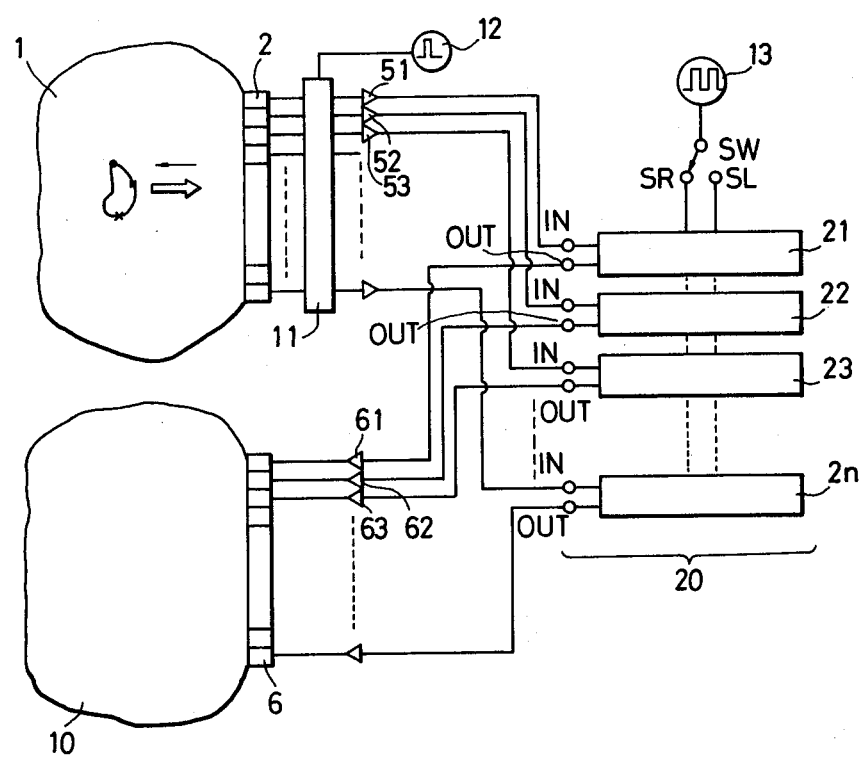
FIG. 3 is a block diagram of an embodiment of an ultrasonic imaging system according to this invention.
Figure 4A:
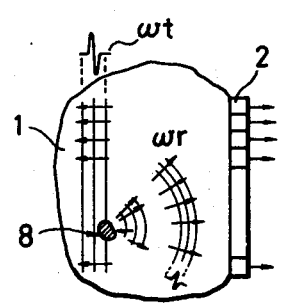
FIGS. 4a through 4d are illustrations useful in the explanation of the basic operation of the embodiment shown in FIG. 3.
Figure 4B:
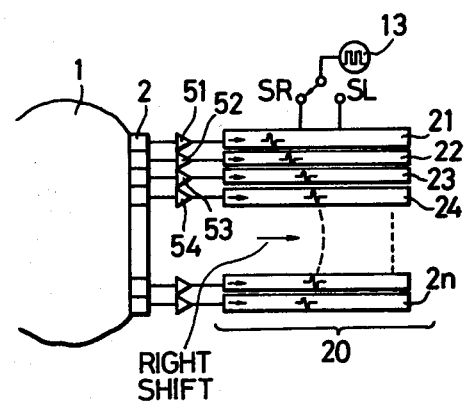
Figure 4C:
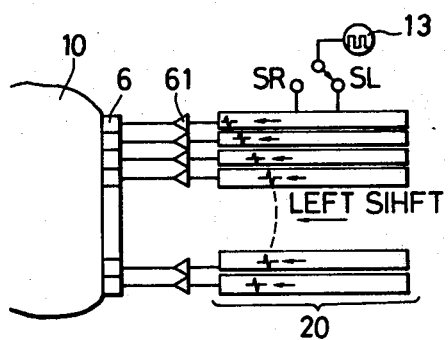
Figure 4D:
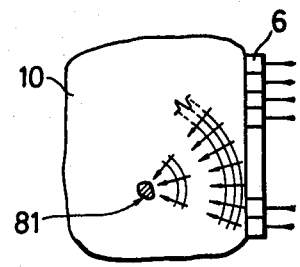

Referring now to FIG. 3 a first array of ultrasonic transducers 2 is coupled to an object body 1, e.g. a human body. A switching circuit 11 couples the first array 2 to drive pulse generator 12 or to amplifiers 51, 52, 53 . . . , selectively. TGC (time-gain control) is applied to these amplifiers 51, 52, 53 . . . in a well-known method as used in typical echo amplifiers in order to amplify more for farther echos while less for nearer echos. A time inversion means 20, comprising analogue waveform memories, e.g. CCDs or BBDs, receives signals from the first array 2 via switching circuit 11 and amplifiers 51, 52 . . . and after memoried provides signal outputs have an inverted time axis. This is done by, for example, using a right-shift, left-shift CCD delay line having a right-shift clock input terminal SR and left-shift clock input terminal SL driven respectively by a suitable clock pulse from a clock pulse generator 13 via direction control switch SW. The power amplifiers 61, 62 . . . amplify these reverse output signals from the time inversion means 20, and drive the second array 6, which has a similar structure to said first array 2. This second array 6 is coupled to the reconstitution space 10, which is filled or constructed with both optically and acoustically transparent material, such as glass, plastics like acryl, polystylene, epoxy, or selected kinds of silicon-rubber, or a liquid like oil, water, etc.

FIG. 4 illustrates the principles of operation of FIG. 3. At first, switch circuit 11 selects the pulse generator 12 for simultaneously pulsing all the elements of the first array 2 thereby generating an ultrasonic planar pulse wavefront wt into the object 1 as illustrated in FIG. 4a. An echo source 8, which represents one of many typical clouded echo sources which may be distributed in the object 1 provides an echo wavefront wr as shown in FIG. 4a. These echo wavefronts wr which are spherical, or within the planar specimen starting from each echo source cylindrical (for tomography), will in due course arrive at and are received by said first array 2, and finally transferred into said time inversion means 20. During the reception of these echo signals, the right-shift clock SR is selected by switch SW. A unit sequence (and corresponding memory length) is set to accept a full range of echo signals from maximum distances of the object under examination, i.e. twice the one-way propagation time of ultrasound. After the time inversion means 20 has completely accepted the set of echo signals, it is driven in the left-shift mode by applying clock pulses 13 to its left-shift clock input terminal SL as seen in FIG. 4c, and left-shift outputs are applied to the second array 6 via high frequency power amplifiers 61, 62 . . . . This provides a series of inverted echo wavefronts reprojected and pushed "back" into the reconstitution space, e.g. like a reversely projected movie film. As seen in FIG. 4d, these wavefronts reconverge into the spots corresponding to their echo-source locations in the object space where they originated. The figures here merely illustrate a single target. However, every echo source will produce an echo signal set which is converged in the same manner as a reversely rotating movie projector producing complex wavefronts. Reversely corresponding to the echo signal generation in the object space according to the travelling of the transmitted planar pulse wavefront, convergence first occurs at the farthest end of the reconstitution space as seen from the second array, and last occurs at the nearest end.

Figure 6:
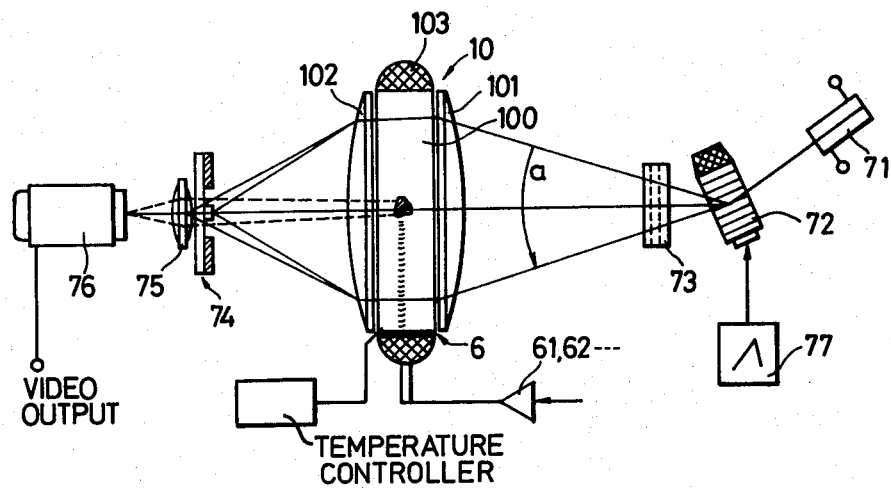
FIG. 6 shows one of many possible embodiments of a visualization means to monitor the ultrasound energy distribution in the reconstitution space.
Figure 7:
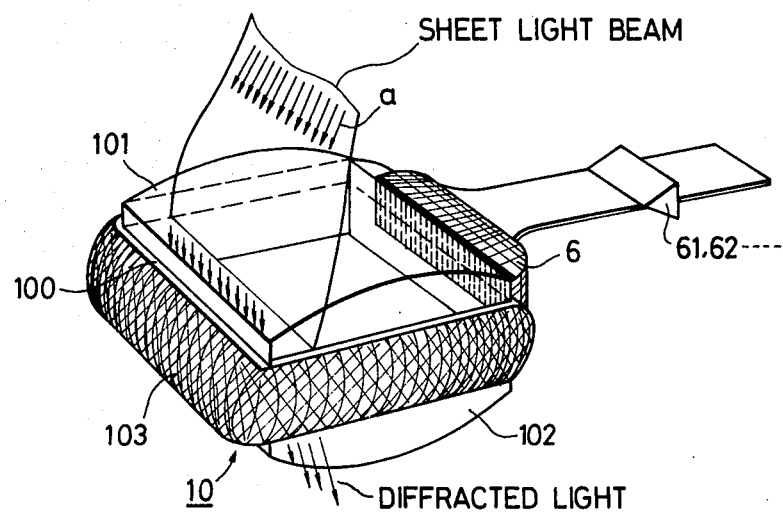
FIG. 7 shows an example of the reconstitution space.

In order to see this convergence, a visualization or display means such as shown in FIGS. 6 and 7 may be employed which will be explained hereinafter.

A desired level of the converged, replicating ultrasonic image is provided by suitably amplifying the inverse echo signals from the time inversion means 20 by high-frequency power amplifiers 61, 62 . . . which enables a suitable level of schlieren observation in said visualization means.

On the other hand, a dimensional scaling of the convergence replica image may be accomplished by suitably scaling in time the readout of reverse echo signals in conjunction with a corresponding mechanical scaling of the second array 6. Such scaling would be accompanied by applying different clock frequencies between the forward read-in and inverse readout sequences. This scaling capability enables quite a bit freedom with respect to the mechanical size of the reconstitution space from the actual object size, and could easily include a scale range of microscopic scale to a marine SONAR scale. This enables the use of a convenient size for the reconstitution space, e.g. several centimeters diameter, as well as suitable sizes for the second array and high frequency power amplifiers, regardless of the object size.

Figure 5:
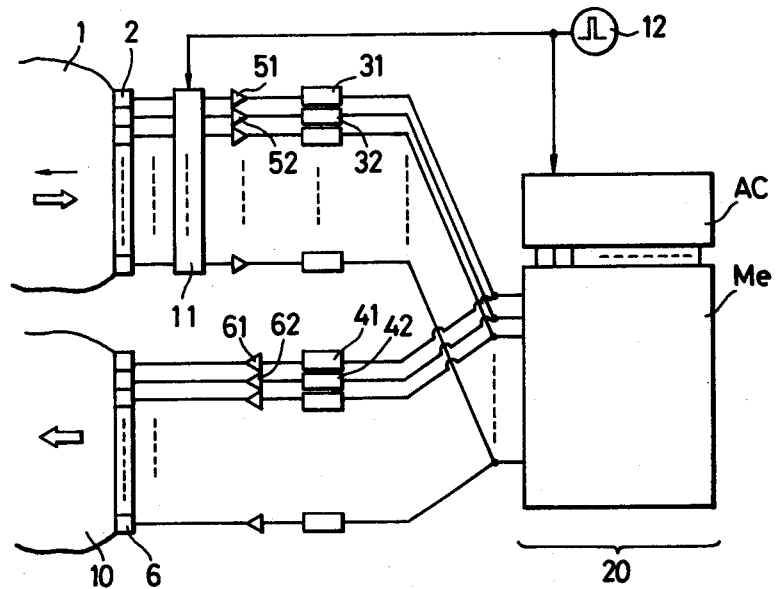
FIG. 5 is a block diagram of another embodiment of this invention.

FIG. 5 shows another embodiment of this invention. In this case the time inversion means 20 is a digital storage device. The echo signals from the first array 2 are, after amplification, converted into digital signal word sequences by A/D converters 31, 32 . . . and fed into a digital memory Me, which may be random access memories or shift registers. Address control or shift control AC is provided to provide a reverse readout capability. In the reverse readout sequence, these signal word sequences (data strings) are converted back to analogue form by D/A converters 41, 42 . . . and amplified by HF power amplifiers 61, 62 . . . to drive the second array 6 at a suitable power level, in a manner similar to the embodiment of FIG. 3. In this configuration, the inverse readout sequence may have its own clock frequency which is independent with respect to the acquisition sequence and wherein the signal sampling clock rate is determined by the applied ultrasound frequency to the object space, or, the object size and nature of the optimal ultrasound frequency for effective sounding. Any magnification or reduction of size between the object and its replica in the reconstitution space is proportional to the size of the second array 6 and the ultrasound wavelength in the reconstitution space at the readout frequency.

FIGS. 6 and 7 illustrate an example of a visualization or display means for the convergence replicating ultrasound energy field, using a swept schlieren method. A light beam source 71, preferably a coherent light beam source, such as a He-Ne laser tube, provides a light beam which is deflected by a light deflector 72, for example, an ultrasound light deflector driven by sweep frequency power oscillator 77. The light beam is then expanded into a sector sheet beam by a lens system 73 partly including a cylindrical component as required. The reconstitution space 10 is swept in a manner indicated by the arrow "a" in FIG. 6 in accordance with the saw-tooth wave generator (the oscillator, modulator and driver for the ultrasound light deflector driving transducer, are not precisely shown here). Synchronism and a suitable phase arrangement should be provided in step with the reverse readout from the time inversion means (not shown).

FIG. 7 illustrates the incidence of sheet light beam into the reconstitution space 10 sandwiched between collimater lenses 101 and 102. The reconstitution space 10 is constructed in a rectangular block of light-transparent silicon rubber, and is surrounded by ultrasound absorbers 103 to prevent undesired internal reflections at its edges, and is coupled through one side window to the second array transducers 6. The collimating lenses 101 and 102 sandwich the active part 100 of the reconstitution space 10 so that the sheet light beam enters and interacts orthogonally with the ultrasound wavefronts, i.e. perpendicular to their propagation direction.

These lenses also focus the light beam on the aperture 74, which acts as the O-th order (non-diffracted) light blocking aperture of the schlieren optical system, and allows only the diffracted light to pass through, as indicated by dotted lines in FIG. 6. This enables the ultrasound energy distribution in the reconstitution space to be visualized via opto-acoustic interaction effect in the material filling the reconstitution space at the moment when and the location where the probing light beam is exposed.

The schlieren optical system used as the visualization means, is an optical band-pass filter for spatial frequencies of the image under examination, the passband of which is determined by the shape of the blocking aperture 74, typically, a transparent ring with blocking discs centered coaxially. The mean radius of the transparent ring $R_a$ is determined relative to light and ultrasound wavelengths $\lambda_c$, $\lambda_a$ in the reconstitution space and focal length L of post collimating lens 102, as follows:

$$R_a = \lambda_c / \lambda_a \cdot L$$

or, with ultrasound frequency $f_r$ and sound velocity $c_O$:

$$R_a = \lambda_c f_r / c_O \cdot L$$

In other words, an optical Fourier transform of the reconstitution space is projected at the aperture 74 by means of the lens 102 (Fourier transforming lens) and the ring aperture 74 selectively allows a certain range of spatial frequency components to constitute its intrinsic image. This also means that the ring aperture extracts the different energy or frequency component (in time) via opto-acoustic interaction in the reconstitution space, the frequency or energy deviation of selected light being equal to the ultrasound frequency or its photon energy.

Merely as an example, when utilizing water for the reconstitution space and a He-Ne laser and a 10 MHz ultrasound source, if lens 102 has a focal length of one meter, the ring aperture diameter should be about 3 mm which is still within range for providing a practical instrument.

Scanning is carried out in accordance with the replicating ultrasound image convergence scheme, i.e. the probing sheet light beam always tracks the "line" of the convergence, beginning from the farthest end and finally the nearest end of the reconstitution space. The scanning is repeated on every inverse readout of the signal from the time inversion means, synchronously triggering or being triggered by each inversion. Even when a single set of echo signals, once stored, is inspected by continuously repeating the inverse readout, the system enables the continuous inspection of a still image taken by a single shot sounding, which would be convenient in a case like marine SONAR where even single shot soundings take alot of time, or also in the case when inspecting a still object, e.g. industrial flaw detection and especially when an echo averaging scheme is employed to improve S/N ratio or the maximum detectable distance.

The diffracted light intensity is proportional to the ultrasound energy density at every spot in the replicated image in the reconstitution space, and with a proper arrangement of interaction energy level, a total reservation of the gradation, referred to as "gray scale" imaging, is assured.

The thickness of the probing sheet light beam deserves some additional discussion. The sheet light beam when applied across the reconstitution space, has its own spatial frequency according to its thickness, which also is discriminated by the spatial band-pass filter function, and determines the practical resolution in a direction across the sheet. The thickness must be at least equal to or more than several wavelengths of ultrasound to enable it to be imaged via the spatial band-pass filter, but not so thick as to sacrifice the resolution, and also not so thin that it will leak through and be imaged via the filter. Accordingly, the ring aperture should block the spatial frequency corresponding to the thickness of sheet light beam while passing the ultrasound. In other words, the thickness or more precisely the intensity distribution across the sheet should not provide such spatial frequency that goes through the passband of the spatial filter. A Gaussian or cosine-square, or other type of less-acute distribution would be better.

Since the sheet light beam is seen as a line in the schlieren optical system and the line always appears in the same direction in the scanning scheme, the shape of the blocking aperture also could be changed in direction. For example, an oblong, or elliptic blocking zone would be preferred to a circular disc in such a case. This applies also, as Dr. Somer points out in his aforesaid report that a certain kind of image processing or enhancement with optical computation could be carried out at the schlieren blocking aperture by using different types of apertures.

After passing through the aperture 74, the replicated image of the object body is ready for visual inspection, recording or display. In FIG. 6 an image sensor 76, e.g. a TV camera with a vidicon or CCD sensor, is used in conjunction with a final lens 75. Such devices have a certain capability of temporal storage of the image focused on its target or substrate, and assures an improved S/N ratio and/or the stability of the video signal, which would be displayed on a TV monitor in real time or recorded by a video tape recorder. Of course, movie or still photography, or even direct inspection through the aperture 74 or any combination of these using a suitable image beam splitter (not shown) may be used for viewing and/or recording as desired. The final lens 75 also focuses the image on desired sizes of targets of such video transducer devices, or photographic films or the like.

Although such a swept schlieren system could presently be the optimal method of visually deriving the replicated image, it is merely one possible approach and other methods may be used.

In the case described above, a single shot sounding is carried out to obtain a complete set of echo signals in the memory devices of the time inversion means, however, for flaw detection and the like in a solid "still" body this invention may be used to carry out a multiple shot sounding with the echo signals therefrom being averaged to improve the S/N ratio or maximum detectable distance. In the case of a still object, real time parallel acquisition of an echo signal set with an array transducer is not always necessary. A classic single transducer, linear mechanical scanner can also provide equivalent information provided that the scanner is mechanically accurate and stable during the step by step line scanning as well as the electronic system used therewith.

On the other hand, in an another embodiment an MTI (moving target indication) system, may be provided by comparing soundings of the echo signals, i.e. subtracting them between neighboring sequences. Such a differential or incremental echo set will selectively visualize only the moving echo sources, like blood flow or cardiac or vascular movements, in a manner similar to conventional pulsed Doppler systems, or MTI RADARs or SONARs with delay line cancellers or equivalent digital processing methods. Of course, higher order MTI processing could be done in the stage of echo set storage in the time inversion means, preferably in digital form processed by software or hardware.

However, in accordance with this invention, MTI processing is simply done using at least a pair of digital or analog waveform memory sets, continuously in real time over each echo sounding without any complicated processings. The subtraction over each sequence would be done simply when reversely reading out, in digital or analog form somewhere between readout and the driving of the second array. This provides an inter-frame MTI imaging system having a frame rate comparable to conventional pulsed Doppler systems, i.e. up to several thousand frames per second, and the arterial flows are seen without Doppler-ambiguity.

Also, when a spread energy signal, like FM-chirped or phase coded "long" pulse, is used instead of a single impulse for transmission, the compression processing might be done also in the stage of the waveform memory.

In another embodiment (not shown) frequency "up" conversion may be carried out at a suitable stage between readout and driving the second array and the higher frequency ultrasound would increase the diffraction angle and consequent efficiency for 1st order diffraction, indicated by the dotted line in FIG. 6 and would not reduce or magnify the reconstitution size. This would shorten the required path-length of the schileren optics, or loosen the requirements for its mechanical (axial) accuracy at and around the blocking aperture 74.

Selection of a lower wavelength of the probing light beam, e.g. infrared and abandoning direct inspection by the eye, would improve on this point, as well as permit the use of slower speed media for the ultrasound in the reconstitution space. However, the isotropic nature and void-free, minimal attenuation of the filling material for both ultrasound and light are important. Water in an optically flat wall tank provides one of the nearly optimal systems, where the optical flat walls would be easily and simply replaced by the collimating lenses 101 and 102. However, using water would not enable a size reduction unless a time compressed readout is combined with a corresponding scaling of the second array. Silicon-rubbers, or moderate molecular weight polyethylene, or mineral oils, or higher order alcohols, etc. would have some chance on this point because they each have slower propagation speeds for ultrasound at a slight expense of attenuation. A transparent silicon-rubber, RTV 602 supplied by GEC has been found to be one of the nearly optimal materials for this purpose but this invention is not to be considered restricted to this material or to water.

It should also be pointed out that temperature stabilization of the reconstitution space would be required in order to obtain the desired sound speed stability and accuracy.

In another embodiment the sounding of the object space may be carried out using separate transmitting and receiving transducers. They could be separate arrays or interleaved in a single array, or a conventional array backed with a single big planar pulser.

In still another embodiment sounding is accomplished by a cylindrical pulse of intense ultrasound instead of using a planar pulse. This can be achieved by, for example, pulsing only one selected element in the central part of the first array. This method requires some modification of scanning with the sheet light beam for the visualization means. The "convergence" occurs in just inverse of the travelling of the initial transmitting pulse in the object space such that convergence occurs along a circle centered at the pulsed element, first at the maximum radius and then approaching and ending at the center. Scanning of the sheet light beam must permit this, so, a conical sheet beam with a variable top-angle must be used. Such a beam is generated, for example, by a high speed Lissajou method with two light deflectors driven in sine and cosine functions for orthogonal directions. This method enables wider angles of inspection with relatively reduced size and less elements in the first and second arrays and less storage is required for time inversion.

The pulser and echo receiving array need not always be in the same or in proximate locations or have a similar configuration. They may be separated and have different configurations provided that the light beam probing the reconstitution space is scanned in accordance with the convergence line, i.e. travelling reverse of the transmitting pulse wavefront. The receiving array could be a random array, or partial array used with a full size planar transmitting pulser with little need for modification on the typical embodiment shown in FIGS. 6 and 7.

Another version would use a totally synchronous excitation of the object space, for example, by coupling a big planar pulser at the bottom instead of at the side wall of the object space. If the specimen under examination is relatively thin and the second propagation time across it be negligible, the echos practically occur almost synchronously with the sound propagation and converted replica. In such a case, scanning across the replica light beam would be unnecessary as the synchronous flashing would be sufficient to observe the image.

Such a totally synchronous excitation may be accomplished, not only by ultrasound but also by electromagnetic or electrostatic pulsed fields, using a special media having magnetstrictive or piezoelectric characteristics or when the object being examined has such characteristics.

An extended version of this invention would replicate the image of a three-dimensional distribution of the objects using two-dimensional arrays for the first and second arrays and using a relatively bulky reconstitution space. In such case, any form of excitation or projection would be possible, however, the signal storage means for time inversion and the schlieren optics would be so huge its feasibility would be restricted. However, such an embodiment provides actual replication of a three-dimensional image without time or spatial multiplexing of two-dimensional pictures.

A special, more important embodiment of the invention resides in using a CW (continuous wave) excitation instead of the pulsed echo system such as FIG. 3. In case of CW, time inversion simply requires a phase arrangement, i.e. inverting the rotating direction of signal vectors by means of a set of phase (and amplitude) memories coupled to each element of the first and second arrays. Although CW imaging in general has a slight problem of speckle noise or fog due to scattered energies, the use of a CW system almost eliminates the need for the bulky waveform memory means required by pulsed sounding methods.

Figure 8:
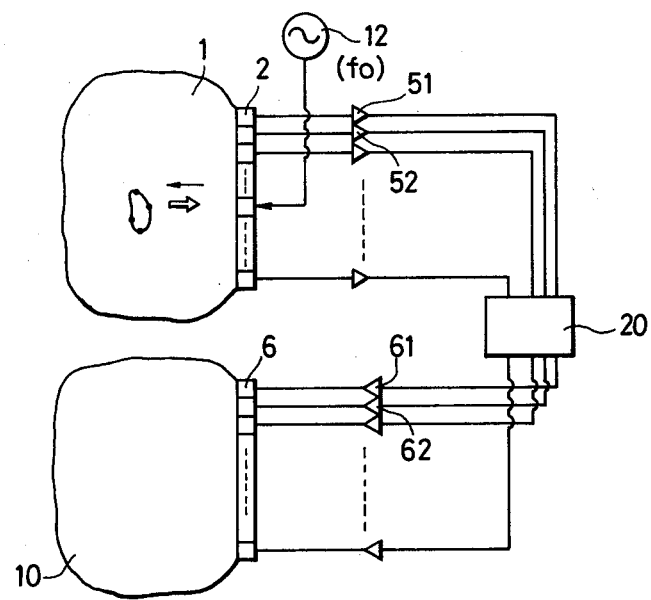
FIG. 8 illustrates another embodiment of this invention.

FIG. 8 illustrates a CW embodiment of the invention. The object space 1, reconstitution space 10, and the first and second arrays 2 and 6, respectively are essentially identical to the embodiment of FIG. 3. However, the transmission is done by driving a selected single element or several elements of the first array 2 by a CW signal source 12 having suitable power level. The back-scattered energies of and from object space 1 are received by same array 2, and are amplified by amplifiers 51, 52 . . . . A set of vector rotation inversion means 20 inverts the back-scattered signal vector rotation, and power amplifiers 61, 62 . . . amplify these inverted vector signals and drive the second array 6 to replicate the scatter source images in the reconstitution space 10. Optoacoustic visualization is also used to inspect the replicated image.

Figure 10:
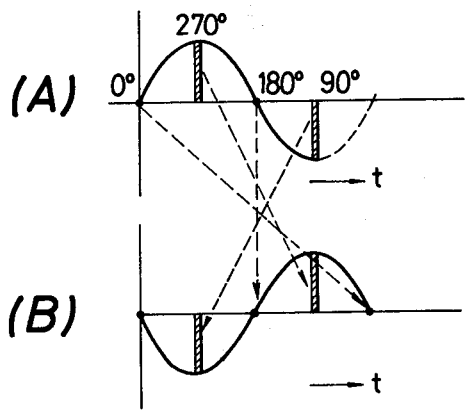
FIG. 10 illustrates waveforms which help explain the theory of operation of FIG. 9.

The vector rotation inversion essentially is carried out in the following ways. FIG. 10 illustrates a selected cycle of a typical sinuosidal or quasi-sinusoidal signals. In CW signaling theory, signals are essentially a continuity of a wave fragment, and a "time" inversion is essentially carried out within a single wavelength, i.e. mutual substitution between 90° and 270° components as illustrated in FIG. 10. With this procedure, cosine (inphase) components are not affected while sine (quadrature) components are inverted. Generally speaking, inversion of either in-phase or quadrature components, not both, provides vector rotation inversion, and thus inverts the direction of wave propagation.

Figure 9:
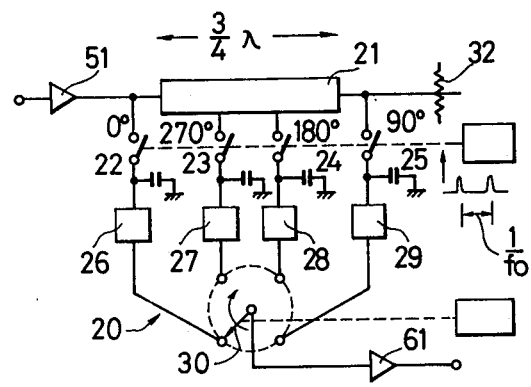
FIG. 9 shows an example of a signal vector rotation inversion means used in the embodiment shown in FIG. 8.

FIG. 9 shows a basic arrangement for vector rotation inversion. A tapped delay line 21 having at least a ¾ wavelength provides four phase taps 0°, 90°, 180°, 270°. Switches sample these taps once per cycle and the signal voltages are stored on capacitors 22, 23, 24 and 25. These sample voltages are buffered by buffer amplifiers 26, 27, 28 and 29, and a multiplexer-scanner 30 scans these sample voltages in an "opposite" way. Amplifier 61 then outputs the reverse rotating signal from scanner 30. An echo-free termination 32 is provided to prevent reverse propagation of unnecessary signals in the delay line 21. However, it may not be necessary to provide such a termination for a ¾ wavelength delay line. CW or quasi-CW enables 180° phase differences to be used for polarity inversion. Thus, FIG. 11 which illustrates a modification of FIG. 9 using polarity inversion is nearly equivalent to FIG. 9. Other equivalents or deviations may be provided to achieve vector inversion.

Figure 12:
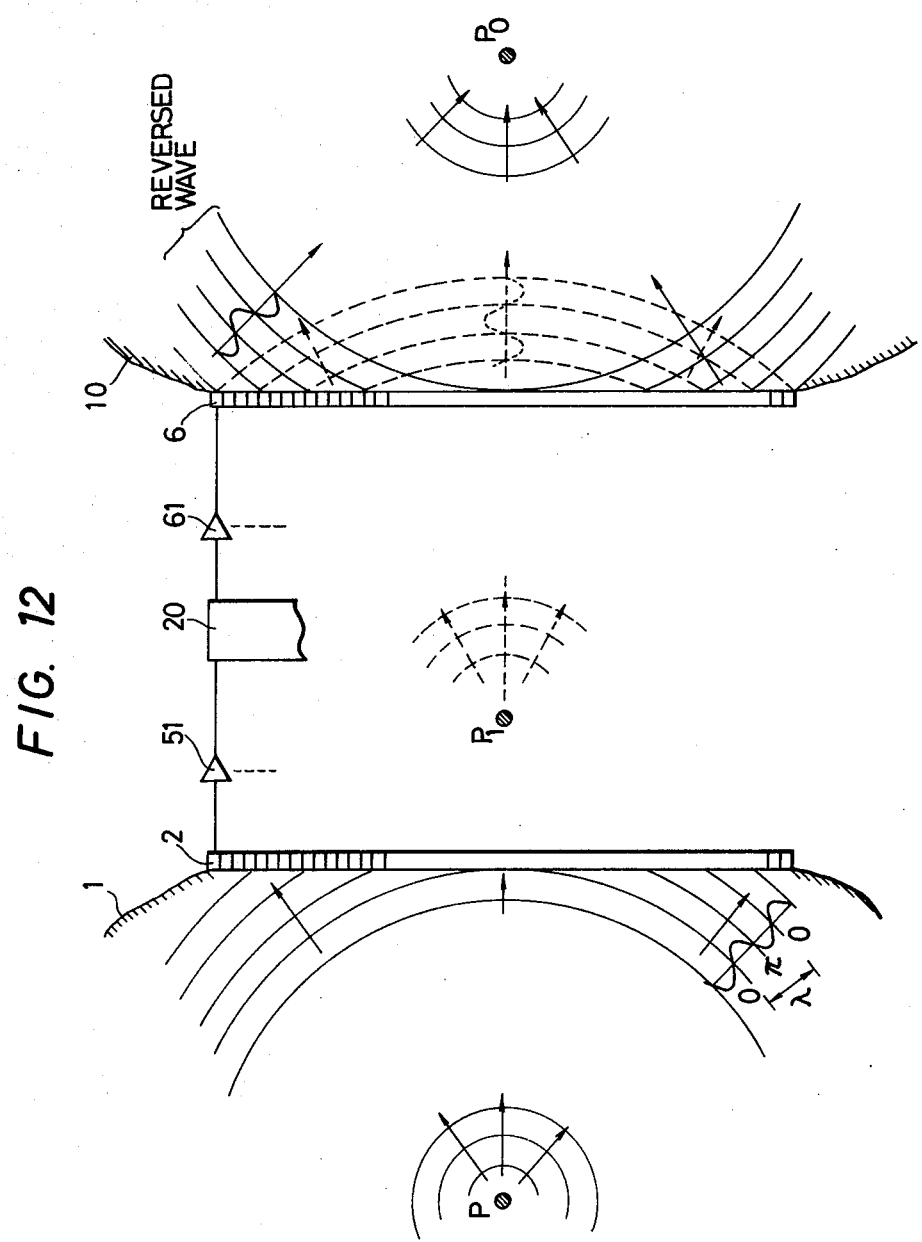
FIG. 12 is used in explaining the theory of operation of FIG. 8.

FIG. 12 illustrates the theory of the reconstitution in the CW system. A CW source P, either a scatter source or an emitter, projects a spherical or cylindrical wave continuously toward the first array 2. Amplifiers 51 and 61, and vector rotation inversion circuit 20 apply the signals from the first array 2 to the second array 6 which reprojects these inverted vector rotation sets of signals toward the reconstitution space 10.

What happens then in the reconstitution space 10 is that, if nothing is done about vector rotation, i.e. directly coupling the first and second arrays 2 and 6, via only amplifiers 51 and 61, it is clear that the incident wavefronts toward the first array 2 appear in diverging form as they should have travelled into behind of the first array 2, from the second array 6 toward the reconstitution space 10, as shown by dotted line arcs in FIG. 12. This simply means that $P_1$, a virtual image of P, appears behind the second array 6 as a pseudo source as also shown by the dotted lines. However, when vector rotation inversion is carried out for all the elements of the signal, the propagation vector is inverted, and the second array 6 transponds such wavefronts that focus on $P_O$ which is a real replica image of P in the reconstruction space 10. This is equivalent to a time inversion of what happened in the object space 1. The source P represents every possible scatter source in the object space 1 and a total acoustic scatter source image is replicated as a mirror image, which is also ready for opto-acoustic inspections, in this case, with a continuous and uniform illumination of the reconstitution space 10 using a schlieren optical system.

Figure 13:
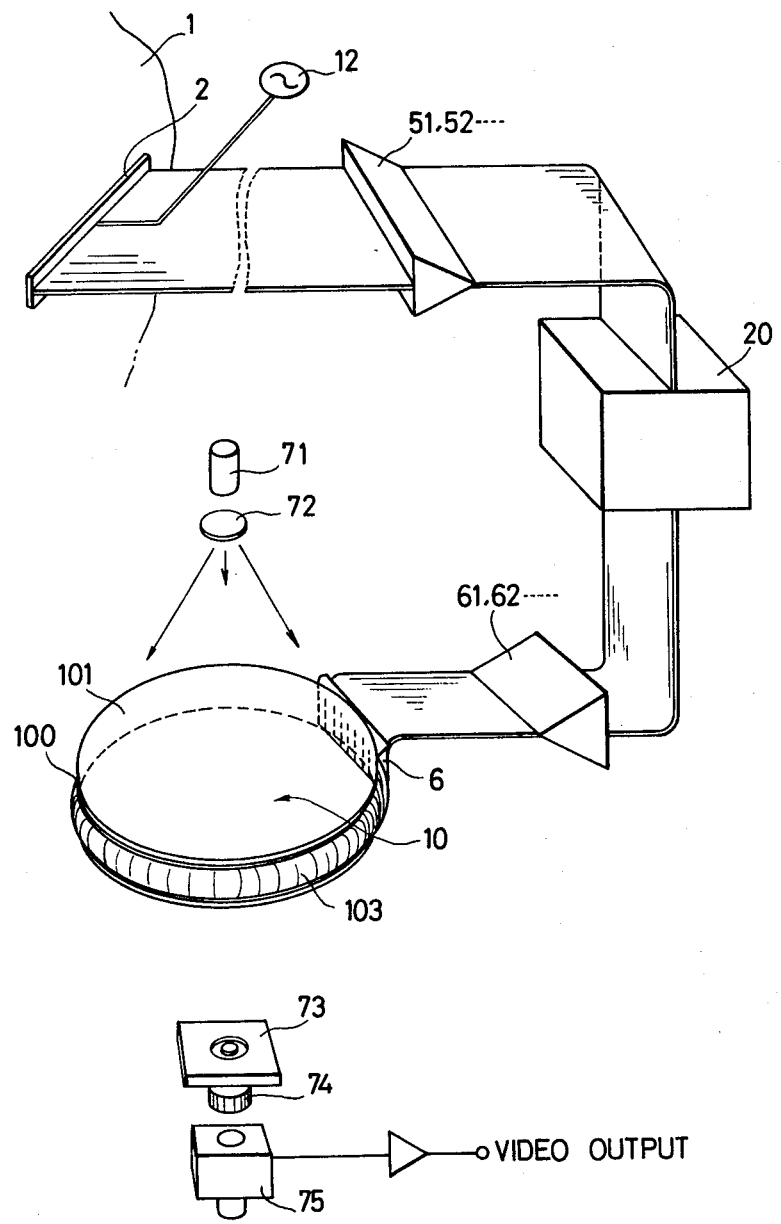
FIG. 13 illustrates an embodiment of FIG. 8.
Figure 14:
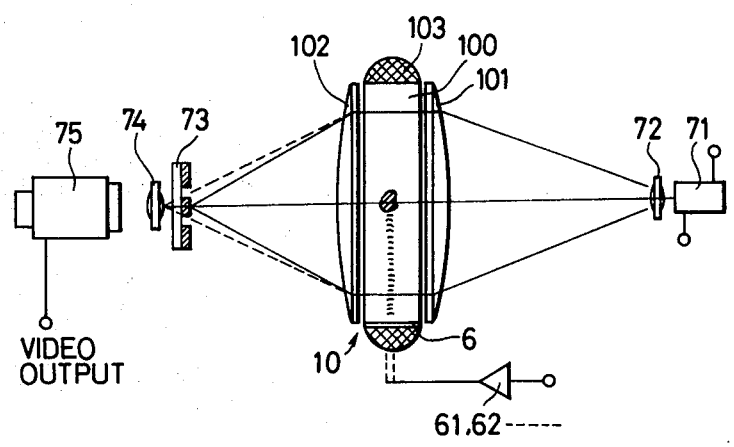
FIG. 14 is an elevational view of the display means used in FIG. 13.

A system setup including a visualization means for the CW embodiment is illustrated in FIG. 13 and FIG. 14. A light beam source, preferably but not restricted to a coherent light source, such as a He-Ne laser tube 71, generates a thin, pencil-beam of intense light, which is expanded by lens 72 into a diverging, uniform beam which illuminates the active part 100 of the reconstitution space 10 in a configuration similar to FIG. 7. A set of collimating lenses 101 and 102 which provides light beam incidence normal to the ultrasound wavefront, i.e. perpendicular to its propagation, focus the light beam on the blocking aperture 73 of a typical schlieren optical system, blocking undiffracted light and extracting only diffracted light through the active part of the reconstitution space. Behind the aperture 73, the diffracted light wave image, i.e. the ultrasound energy distribution in the reconstitution space, is ready for visual inspection. An image sensor 75 may be used in the form of a TV camera with vidicon or CCD imager and includes a final focusing lens 74. A TV monitor for real time monitoring, or a video tape recorder may be used for image storage.

Of course, movie or still photography, or direct inspection with the eye, or a combination of these may be used. The final lens 74 focuses the image on a desired size target or film.

Figure 15:
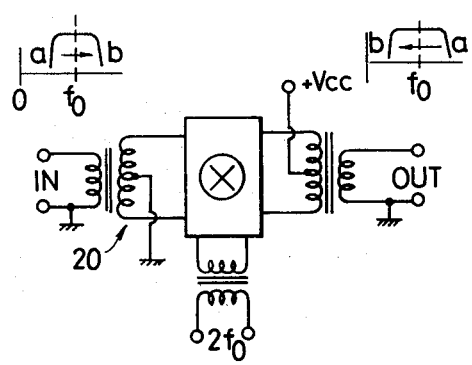
FIGS. 15 through 18 are block diagrams of various types of said vector rotation inversion means which may be used in the embodiment shown in FIG. 8.

The CW embodiment of this invention as described may take various forms and may be modified in accordance with a particular application. The vector rotation inversion could be a frequency spectral inversion centered at a certain frequency, i.e. center frequency system having a narrow band-pass. This implies a reciprocal situation to the "time" inversion arrangement seen in the basic embodiment of this invention. This approach leads to other methods of signal processing to obtain a converging wavefront from the second array 6 to the reconstitution space 10. FIG. 15 illustrates a $2f_O$ heterodyne mixing arrangement where a unit circuit 20 mixes and heterodynes each signal with a $2f_O$ frequency carrier to obtain spectrally inverted sidebands having identical center frequencies of the signal. A band-pass filter around $f_O$ would be used (not shown) to suppress the $3f_O$ and other unnecessary components prior to driving the second array 6.

Figure 16:
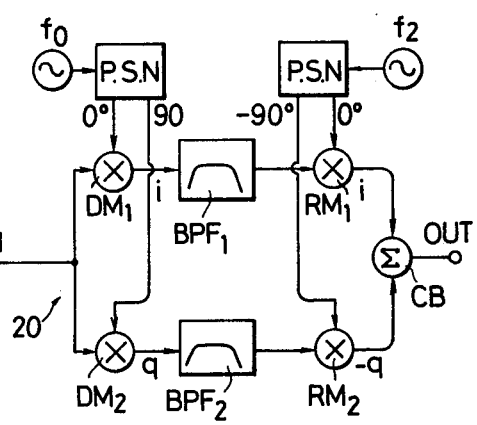

FIG. 16 shows a modified embodiment of FIG. 15 where a pair of balanced demodulators $DM_1$ and $DM_2$ provide in-phase and quadrature demodulation outputs i and q. After these baseband signals are filtered by band-pass filters $BPF_1$ and $BPF_2$, respectively and then re-modulated (cross-modulated), i.e. in-phase component by the quadrature carrier and vice versa, they are combined to obtain a signal to drive a certain element of the second array 6. This provides a kind of MTI/Doppler imaging system because the band-pass filters $BPF_1$ and $BPF_2$ stop the stationary components and allow only moving components, i.e. time varying components of the back-scattered ultrasound signals from object body to be re-modulated into inversely rotating vectors at frequency $f_2$.

Substituting the band-pass filters $BPF_1$ and $BPF_2$ with suitable low pass filters would provide an ordinal stationary object imaging system, where a lower cut-off, or longer integration time of these low pass filters would allow the i and q baseband components to be averaged over a longer duration, and improve the S/N ratio for stationary object imaging.

Differentiators or high pass filters are equivalent to the low pass filters but less optimal substitutes in the case of MTI/Doppler imaging systems, while integrators could be used for the low pass filters in case of a stationary object imaging system. Not only moving objects but also time-varying scatter sources can be effectively imaged in spite of their situations and this embodiment would provide a novel possibility for simple Doppler imaging which is especially effective for vascular studies.

In the above mentioned applications related to FIG. 16, a frequency conversion would be carried out in case if $f_O \neq f_2$. This would also enable magnification or reduction of size replicated image in conjunction with appropriate scaling of the second array similar to the pulsed sounding scheme previously described.

Figure 17:
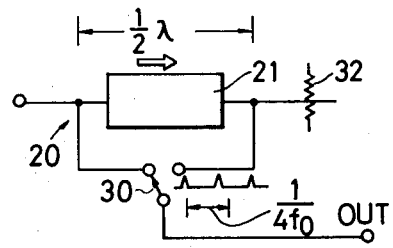

In FIG. 17, a ½ wavelength delay line is used with switch 30 to obtain an output signal from its input $f_O$, the output being switched on every $\frac{1}{2}T(T=1/f_O)$. The output of the switch 30 should also be band-pass filtered around $f_O$ prior to driving the second array 6.

Figure 18:
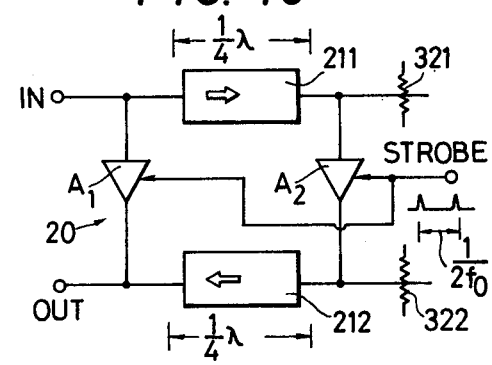

Also in FIG. 18, a pair of ¼ wavelength delay lines 211 and 212 are coupled together across a set of strobed amplifiers $A_1$ and $A_2$, which are strobed and activated once per every $\frac{1}{2}f_O$ (i.e. T/2). This provides a cascaded reverse propagating output for every ½ wavelength of the signal. The output may also be band-passed.

Figure 11:
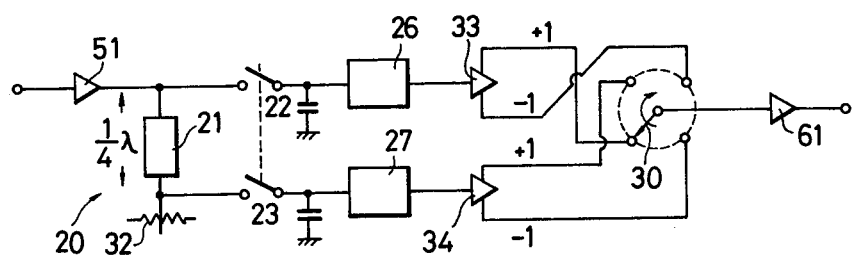
FIG. 11 shows another example of a vector rotation inversion means.

On the other hand, in case of FIG. 9 and/or FIG. 11, the samplers shown could also be replaced by box-car integrators, or sampling or strobed integrators, or have additional low pass filters for S/N improvement located prior to the "rotary switch", i.e. the multiplexer-scanner, while if band-pass filters are used provide the MTI/Doppler imaging system.

Rotating the rotary switch faster or slower than the sampling rate would produce frequency multiplication or division (and also phase or vector rotation) and such multiplication would amplify the diffraction angle in the schlieren optical system and make its construction easier, but would not affect the replicating size, and consequently the need of dimensional scaling of the second array or reconstitution space.

Relaxed methods might be possible at the slight expense of additional "fog" due to co-existence of both converging and diverging wave energy at the same time in the reconstitution space, by not inverting but eliminating only the quadrature (or in-phase) component. For example, in FIG. 16, the omission of either the i or q channel eliminates the need for $DM_1$, $BPF_1$, $RM_1$ as well as both phase splitting networks (P.S.N.) and summing circuit $\Sigma$ and still provides an array with a half strength converging wavefront as compared with a complete system, and still enables a replication of an image.

The CW ultrasound projection for the object space does not necessarily have to come from a central part of the first array 2, as practically any such projection will still successfully enable CW imaging. Also the projection source is not restricted to pure CW, as long as a narrow band requirement is satisfied, i.e. a wavetrain travelling across the arrays are long enough compared with the acoustic length of the arrays across the propagation direction. FM-CW or multiple frequency superposed CW, or phase coded or chirped spread spectrum signals are still within a suitable range of this system. On the other hand, the depth-gain compensation against attenuations of both media which has been accomplished as "TGC" in pulsed sounding, is not applicable in CW imaging. However, an equivalent result would be carried out by a suitable modification of the intensity distribution of the probing light over the reconstitution space, when it is to be opto-acoustically inspected.

In the basic and various modified embodiments of this invention which have been disclosed all have employed an opto-acoustic interaction to visualize the replicated acoustic images. However, the replication need not always be done with bulk wave, or visualization of said replicated acoustic image need not always be in such a complicated system including critical mechanics. The different versions of any of the above identified embodiments might use surface acoustic waves (SAW) instead of bulk waves, for easier generation as well as easier fabrication of the device. In such a case, the reconstitution space (or "phase") is a SAW propagating surface with a suitable array of wide band SAW transducers at its edge.

The schlieren visualization system if used, could be a reflection type instead of the illustrated transmission type of optics. Accordingly, reflection and not transparency is required which would be improved by polishing or plating or evaporating or sputtering a reflective surface of Al, Ag, Au or Cr. Also a reflection type schlieren optical system requires only about half the mechanical length of a transmission type system which enables easier construction. A reflection system is essentially free from misalignment between the probing light beam and the ultrasound wavefront which might be so in a bulk wave interaction degrading available overall system resolution.

Using SAW technology, replicated energy may be seen by scanning the replication with an electron beam. When a piezoelectric substrate, e.g. PZT-ceramics or ZnO on glass, is used, SAW provides an electric potential which may be probed by scanning with an electron beam in a suitable manner. Such electron beam probing is already well-known technology, i.e. vidicon or image-orthicon, including the bulk-wave acoustic imaging tube, i.e. Sokolou tube. A SAW version of such an imaging tube may be provided wherein the internal surface of the target substrate would be suitably prepared for isotropic propagation of SAW and combined with a suitable type SAW transducer array and a SAW absorber at or near the edges of the SAW substrate along with other necessary structures to form a complete "vacuum tube" including an electron gun, focusing, deflection and alignment electrodes, or external coils thereon.

However, even when a schlieren optical system is used with bulk wave ultrasound in the light transparent reconstitution space, the coherence of the light source 71 is not an essential requirement for this visualization method. The He-Ne laser is used merely to obtain a thin pencil beam with no preparation such as lamp houses or lenses or pin-hole apertures. Here any other light source would be adaptable for this purpose, e.g. zenon-flash, sodium or mercury lamp, tungsten lamp or with or without halogen, or LED (light emitting diode), or semiconductor laser diode, or any other kind of gas or solid, CW or pulsed lasers in accordance with the visualization scheme.

The ultrasound imaging system, here disclosed in its various embodiments, deserves still some note with respect to the image storage or recording scheme. As used with an image sensor means like a TV camera, the image under inspection with this system could of course be recorded by a video signal recording means such as VTR or video disc. However, another possible storing scheme which may be used in conjunction with this system is to store the echo data set temporary in the waveform memory means which is used directly in the time inversion means, preferably as a digital data set. This "unprocessed" data set still has significant changes of drop-out or contamination without significant degradation of the reconstituted image with any sort of noises in playing back the image because the data set has a certain kind of "spread" data set of object images according to the general theory of array data handling and processing, in spite of the video signal storage scheme being so "weak" for such a drop-out or S/N degradation. Also less amplitude resolution is required than in actual pixcel data handling. Even 20 to 30% or slightly more of such data string array, corresponding to the elements of the first and second array and channels, could be omitted without being seen by the human eye, unless intensive, detailed observation is willingly performed on the resultant image. It is expected that a total data reduction can be made in such a storage scheme compared with the video (pixcel) signal storage scheme, for example, typical precision TV frame data sets having about $3 \times 10^5$ ($\cong 525$ line $\times 600$ spot/line) pixcels with at least 4 to 6 bit resolution as compared with this scheme of direct echo data set storage with about $1 \times 10^5$ ($\cong 100$ element $\times 1000$ point, i.e. 250 wavelength) data points with 3 or 4 bit resolution using an optimistic estimation. Still less numbers or reduced resolution of the data string set would still provide a quahitative picture for diagnostic use. Also in this scheme of unprocessed data set storage, an extended flexibility for post- or remote-diagnosis would be assured with post-processing capability upon the data set when playing back.

Thus in this scheme, the image storage means comprises a digital data storage means coupled to the waveform memory to swap-out and swap-in the echo signal data set as necessary, wherein the digital data storage media is like a magnetic tape or disc, especially digital cassette or floppy disc, etc.

We claim:

1. An ultrasound imaging system comprising:

a first array of ultrasound transducers coupled to an object space which accepts and transducers the ultrasound energy generated or scattered by an object body in said object space, time inversion means coupled to said first array of ultrasound transducers for storing the signals from said first array and then providing inverse readouts of the same, a second array of ultrasound transducers driven by the inversely readout signals from said time inversion means, image reconstitution space filled by optically and acoustically transparent, isotropic material coupled to said second array of ultrasound transducers for providing a replication of the ultrasound image of said object body with ultrasound energy supplied by said second array of ultrasound transducers to said image reconstitution space, visualization means coupled to said image reconstitution space to display the ultrasound energy distribution in said image reconstitution space, said visualization means having at least a probing energy source for projecting said probing energy in the reconstitution space in a predetermined manner, and image sensor means responsive to interaction energy in said reconstitution space which has interacted with said probing energy in said reconstitution space, ultrasound energy projection means coupled to said object space for ultrasonically exciting said object body to provide characteristic echos therefrom which are detected by said first array of ultrasound transducers, wherein said ultrasound energy projection means transmits impulse ultrasound energy, and said time inversion means accepts the pulsed echo sequence from said object body via each of the elements of said first array, the echo sequences having at least sufficient length to include all the echos from the object under examination responsive to said pulsed ultrasound energy, and each of said echo sequences are subsequently readout inversely in their time axis from said time inversion means providing a simultaneous and parallel data string at a predetermined readout rate, said second array being driven by said data string to reproject an inversely travelling set of said echo sequences, and having waveform memory means in said time inversion means in which multiple echo data sets over a multiple number of said pulsed soundings of said object body are effectively averaged to obtain an averaged echo data set with reduced noise and/or ambiguity in said replicated image.

2. An ultrasound imaging system of claim 1 wherein at least two or more neighboring echo data sets are sequentially compared in said waveform memory means of said time inversion means to cancel out any non-moving components while extracting the moving components selectively from said echo data set whereby only the moving targets are replicated and visualized in the reconstitution space.

3. An ultrasound imaging system of claim 1 wherein a set of echo data prepared in said waveform memory means in said time inversion means is repetitively readout inversely providing a still observation of the reconstituted image given by said data set.

4. An ultrasound imaging system of claim 1 wherein said waveform memory means in said time inversion means is an analog sequential memory comprising a cascaded sample hold and transfer means having clocked right-shift and left-shift transfer control means.

5. An ultrasound imaging system of claim 1 wherein said waveform memory means in said time inversion means is a set of digital, random or sequential access memory means having analog to digital and digital to analog conversion means and address or recirculation control logic means.

6. An ultrasound imaging system comprising:

a first array of ultrasound transducers coupled to an object space which accepts and transduces the ultrasound energy generated or scattered by an object body in said object space, time inversion means coupled to said first array of ultrasound transducers for storing the signals from said first array and then providing inverse readouts of the same, a second array of ultrasound transducers driven by the inversely readout signals from said time inversion means, image reconstitution space filled by optically and acoustically transparent, isotropic material coupled to said second array of ultrasound transducers for providing a replication of the ultrasound image of said object body with ultrasound energy supplied by said second array of ultrasound transducers to said image reconstitution space, visualization means coupled to said image reconstitution space to display the ultrasound energy distribution in said image reconstitution space, said visualization means having at least a probing energy source for projecting said probing energy in the reconstitution space in a predetermined manner, and image sensor means responsive to interaction energy in said reconstitution space which has interacted with said probing energy in said reconstitution space, wherein a light beam source comprises said probing energy source and a schlieren optical system comprises said image sensor means, and wherein said inversely readout echo signals are frequency converted prior to reprojection with said second array whereby the diffraction angle of interacting components in said schlieren optical system is enhanced.

7. An ultrasound imaging system comprising:

a first array of ultrasound transducers coupled to an object space which accepts and transduces the ultrasound energy generated or scattered by an object body in said object space, time inversion means coupled to said first array of ultrasound transducers for storing the signals from said first array and then providing inverse readouts of the same, a second array of ultrasound transducers driven by the inversely readout signals from said time inversion means, image reconstitution space filled by optically and acoustically transparent, isotropic material coupled to said second array of ultrasound transducers for providing a replication of the ultrasound image of said object body with ultrasound energy supplied by said second array of ultrasound transducers to said image reconstitution space, visualization means coupled to said image reconstitution space to display the ultrasound energy distribution in said image reconstitution space, said visualization means having at least a probing energy source for projecting said probing energy in the reconstitution space in a predetermined manner, and image sensor means responsive to interaction energy in said reconstitution space which has interacted with said probing energy in said reconstitution space, wherein a light beam source comprises said probing energy source and a schlieren optical system comprises said image sensor means, and wherein the spatial frequency of said light beam source probing said reconstitution space is within s predetermined range to prevent said spatial frequency from infringing with the predetermined passband for interacting components in the reconstitution space at the blocking aperture of said schlieren optical system.

8. An ultrasound imaging system of claim 7 wherein said blocking aperture in said schlieren optical system has the shape of said light beam source to effectively and selectively prevent the spatial frequency component inherent in the shape of said light beam source to interfere with the replicated image.

9. An ultrasound imaging system of claim 7 wherein said aperture in said schlieren optical system is shaped to process or produce a desired characteristic of said replicated image being inspected through said aperture.

10. An ultrasound imaging system comprising:

a first array of ultrasound transducers coupled to an object space which accepts and transduces the ultrasound energy generated or scattered by an object body in said object space, time inversion means coupled to said first array of ultrasound transducers for storing the signals from said first array and then providing inverse readouts of the same, a second array of ultrasound transducers driven by the inversely readout signals from said time inversion means, image reconstitution space filled by optically and acoustically transparent, isotropic material coupled to said second array of ultrasound transducers for providing a replication of the ultrasound image of said object body with ultrasound energy supplied by said second array of ultrasound transducers to said image reconstitution space, visualization means coupled to said image reconstitution space to display the ultrasound energy distribution in said image reconstitution space, said visualization means having at least a probing energy source for projecting said probing energy in the reconstitution space in a predetermined manner, and image sensor means responsive to interaction energy in said reconstitution space which has interacted with said probing energy in said reconstitution space, and wherein a temperature control means is used to control and stabilize the temperature of the filling material in the reconstitution space to provide a predetermined constant propragation velocity for the ultrasound transmitted therein.

11. An ultrasound imaging system comprising:

a first array of ultrasound transducers coupled to an object space which accepts and transduces the ultrasound energy generated or scattered by an object body in said object space, time inversion means coupled to said first array of ultrasound transducers for storing the signals from said first array and then providing inverse readouts of the same, a second array of ultrasound transducers driven by the inversely readout signals from said time inversion means, image reconstitution space filled by optically and acoustically transparent, isotropic material coupled to said second array of ultrasound transducers for providing a replication of the ultrasound image of said object body with ultrasound energy supplied by said second array of ultrasound transducers to said image reconstitution space, visualization means coupled to said image reconstitution space to display the ultrasound energy distribution in said image reconstitution space, said visualization means having at least a probing energy source for projecting said probing energy in the reconstitution space in a predetermined manner, and image sensor means responsive to interaction energy in said reconstitution space, which has interacted with said probing energy in said reconstitution space, and wherein said time inverion means comprises at least a pair of memory means with said pair of memory means each accepting selected segments of waveform of the ultrasound signals from said object body via each element of said first array, the segment comprising at least a half wavelength of said signal for providing each element a single pair of in-phase (i) and quadrature (q) components of a reference carrier having a suitable center frequency and said time inversion being continuously performed within every single complete cycle of such signals by inverting only one of said i or q components, providing a set of inverted vector rotations inverted with respect to said center frequency as an output of said time inversion means applied to drive said second array thereby forming a continuous, uninterrupted convergence of the replicating image of the object body in a CW imaging form.

12. An ultrasound imaging system of claim 11 wherein said ultrasound projection means transmits a CW or a quasi-CW, band-limited ultrasound energy omnidirectionally toward the object space.

13. An ultrasound imaging system of claim 11 wherein said time inverted, or spectrum inverted signals are frequency multiplied prior to reprojection via said second array to obtain an increased diffraction angle for said probing light energy via the reconstitution space thereby providing a simpler mechanical construction of the visualization means.

14. An ultrasound imaging system of claim 11 wherein said time inverted signals are frequency converted prior to said reprojection via said second array, and said second array is scaled in accordance to the ultrasound wavelength in said reconstitution space at the converted frequency and the object image to be replicated is magnified or reduced in said reconstitution space.

15. An ultrasound imaging system of claim 11 wherein said visualization means comprises a schlieren optical system which scans the reconstitution space continuously and simultaneously but not with a uniform distribution of probing energy in order to probe farther object images more intensively to enhance and inspect a desired part of said replicating image and to compensate for the ultrasound attenuation in the object space.

16. An ultrasound imaging system of claim 11 wherein said set of vector information i and q are averaged or low-pass filtered over a suitable time constant to obtain a improved S/N ratio set of such information and consequently an improved replication of the object image.

17. An ultrasound imaging system of claim 11 wherein said set of vector information i and q are differentiated or high-pass or band-pass filtered within a suitable time constant or passband to obtain a set of such information concerning and representing the Doppler-shifted or time-varying part of the ultrasound signals from the object body to replicate and inspect the moving or time-varying object selectively in the reconstitution space.

18. An ultrasound imaging system comprising:
a first array of ultrasound transducers coupled to an object space which accepts and transduces the ultrasound energy generated or scattered by an object body in said object space,
time inversion means coupled to said first array of ultrasound transducers for storing the signals from said first array and then providing inverse readouts of the same,
a second array of ultrasound transducers driven by the inversely readout signals from said time inversion means,
image reconstitution space filled by optically and acoustically transparent, isotropic material coupled to said second array of ultrasound transducers for providing a replication of the ultrasound image of said object body with ultrasound energy supplied by said second array of ultrasound transducers to said image reconstitution space,
visualization means coupled to said image reconstitution space to display the ultrasound energy distribution in said image reconstitution space, said visualization means having at least a probing energy source for projecting said probing energy in the reconstitution space in a predetermined manner, and image sensor means responsive to interaction energy in said reconstitution space which has interacted with said probing energy in said reconstitution space,
wherein said visualization means comprises a planar substrate suitable for isotropic propagation of a surface acoustic wave (SAW) thereon, and piezoelectric transduction means for said surface acoustic wave uniformly covering the surface of said substrate, and said second array of ultrasound transducers, an array of surface acoustic wave transducers located at the edge of said substrate, and surface acoustic wave absorbers positioned around the edges of said substrate and said probing energy source means comprising an electron gun having at least a set of beams generating a stream of electron beams toward said substrate as its target, beam deflection and focusing means for said electron gun, a vacuum means surrounding said electron gun and the surface of said substrate being utilized as said reconstitution space and the replicated surface acoustic wave image being probed and sensed directly or indirectly by said electron beams via said piezo-electric transduction means on said reconstitution surface.

19. A method of producing an optical image in an ultrasonic imaging system comprising:
transmitting continuous wave ultrasonic energy into an object, having an acoustic reflector for intercepting ultrasonic energy, to be examined;
receiving echo signals responsive to said ultrasonic energy intercepting an acoustic reflector in the object and converting said echo signals into echo responsive electrical signals;
filtering said echo responsive electrical signals for forming output signals indicative of the Doppler frequency shift of said echo responsive electrical signals;
storing data commensurate with said output signals in received sequential order;
retrieving said stored data in time-reversed order;
transmitting responsive to said retrieved timereversed data ultrasonic energy signals into a reconstruction medium for forming a reconstructed acoustic image of the acoustic reflector, and
converting said reconstructed acoustic image into an optical image.

* * * * *